United States Patent
Hurley et al.

(10) Patent No.: US 12,135,991 B2
(45) Date of Patent: *Nov. 5, 2024

(54) MANAGEMENT PLANE ORCHESTRATION ACROSS SERVICE CELLS

(71) Applicant: Oracle International Corporation, Redwood Shores, CA (US)

(72) Inventors: Gabriel Thomas Hurley, Oakland, CA (US); Danne Lauren Stayskal, Eastsound, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/429,688

(22) Filed: Feb. 1, 2024

(65) Prior Publication Data

US 2024/0211308 A1 Jun. 27, 2024

Related U.S. Application Data

(63) Continuation of application No. 17/370,892, filed on Jul. 8, 2021, now Pat. No. 11,948,002.

(51) Int. Cl.
G06F 9/48 (2006.01)
G06F 9/54 (2006.01)

(52) U.S. Cl.
CPC .......... *G06F 9/4881* (2013.01); *G06F 9/547* (2013.01)

(58) Field of Classification Search
None
See application file for complete search history.

(56) References Cited

U.S. PATENT DOCUMENTS

| | | | |
|---|---|---|---|
| 6,597,956 B1 * | 7/2003 | Aziz | G06F 11/1425 712/31 |
| 7,703,102 B1 * | 4/2010 | Eppstein | H04L 67/1023 718/100 |
| 8,032,634 B1 * | 10/2011 | Eppstein | H04L 67/34 709/226 |
| 8,335,768 B1 | 12/2012 | Desai et al. | |

(Continued)

OTHER PUBLICATIONS

U.S. Appl. No. 17/370,892, Notice of Allowance mailed on Dec. 13, 2023, 18 pages.

(Continued)

*Primary Examiner* — Van H Nguyen
(74) *Attorney, Agent, or Firm* — Kilpatrick Townsend & Stockton LLP

(57) ABSTRACT

Service cells may be utilized to limit the blast radius and reduce the probability of operational incidents (e.g., attacks, load spikes, distributed thrash, and the like). Techniques discussed herein provide any suitable number of service cells, each if which include a management plane and a data plane. A work request that includes an intended state of the service cell can be received and stored. One or more execution tasks can be executed by a management plane of the service cell to bring the data plane to a state corresponding to the intended state. The management plane can monitor the actual state of the data plane with respect to the intended state (e.g., the state requested by a user). Over time, the management plane can make modifications to the service cell to ensure the resources of the data plane are ever in conformance with the intended state requested by the user.

15 Claims, 11 Drawing Sheets

(56) References Cited

U.S. PATENT DOCUMENTS

| | | | |
|---|---|---|---|
| 8,938,540 B2 * | 1/2015 | Van Biljon | H04L 63/102 |
| | | | 370/428 |
| 9,229,774 B1 | 1/2016 | Wilkes et al. | |
| 10,277,466 B2 | 4/2019 | Manickam et al. | |
| 10,592,280 B2 * | 3/2020 | Ballantyne | G06F 9/5027 |
| 11,120,006 B2 | 9/2021 | Terry et al. | |
| 11,237,861 B2 | 2/2022 | Parihar et al. | |
| 11,263,041 B2 | 3/2022 | Desai et al. | |
| 11,281,491 B2 | 3/2022 | Bruun et al. | |
| 11,422,846 B2 | 8/2022 | Cao et al. | |
| 11,556,372 B2 | 1/2023 | Dontu et al. | |
| 11,556,373 B2 | 1/2023 | Shepherd et al. | |
| 11,604,672 B2 | 3/2023 | Subramanian et al. | |
| 11,829,254 B2 | 11/2023 | Herman et al. | |
| 11,948,002 B2 * | 4/2024 | Hurley | G06F 9/5077 |
| 2010/0332530 A1 | 12/2010 | McKelvie et al. | |

OTHER PUBLICATIONS

U.S. Appl. No. 17/469,668, Notice of Allowance mailed on Aug. 4, 2023, 9 pages.

* cited by examiner

```
{
    "id": "clusterID",              ← 402
    "intended": {
        "endpoint_ID": "endpointExample.com",   ← 404
        "vcn_ID": "myVCN",          ← 406
        "nodes: [                    ← 414
            {
                Param1: value1,
                Param2: value2,     ⎫
                Param3: value3,     ⎬ 408
                Param4: value4,     ⎭
                ...
            },
            {
                Param1: value1,
                Param2: value2,     ⎫
                Param3: value3,     ⎬ 410
                Param4: value4,     ⎭
                ...
            },
            {
                Param1: value1,
                Param2: value2,     ⎫
                Param3: value3,     ⎬ 412
                Param4: value4,     ⎭
                ...
            },
        ],
        "software": {
            Param1: value1,         ⎫
            Param2: value2,         ⎬ 412
            Param3: value3,         ⎭
            ...
        }
    }
}
```

FIG. 4

```
{
    "id": "clusterID",        ← 502
    "actual": {
        "nodes: [             ← 505
            {
                ActualParam1: value1,
                ActualParam2: value2,    } 504
                ActualParam3: value3,
                ...
            }
        ]
    },
    "meta": {
        MetadataParam1: value1,
        MetadataParam2: value2,    } 508
        MetadataParam3: value3,
        ...
        "nodes: [
            {
                Param1: value1,
                Param2: value2,
                Param3: value3,    } 510
                Param4: value4,
                ...
            }
        ]
        "load_balancers": [
            {
                BalancerParam1: value1,
                BalancerParam2: value2,   } 512
                ...
            ]
        }
    ],
},
}
```

500 (overall)
506 (brace around meta block)

FIG. 5

MANAGEMENT PLANE ORCHESTRATION ACROSS SERVICE CELLS

CROSS-REFERENCE TO RELATED APPLICATION

This application is a continuation of U.S. Non-Provisional patent application Ser. No. 17/370,892, filed Jul. 8, 2021 (now U.S. Pat. No. 11,948,002), the content of which is hereby incorporated by reference in its entirety for all purposes.

BACKGROUND

Cloud-based platforms have become increasingly common. Cloud data centers are challenged to provide high performance and quality service. Such cloud-based platforms may offer entire suites of cloud solutions built for a tenant's data. Resources assigned to the tenant may reside in one or more service cells (each one being an example of an isolated set of resources). Service cells provide a number of benefits such as limiting the blast radius of bugs, attacks, load spikes, and other forms of sustained emergent performance degradation. The particular resources needed to process workflows related to that tenant may vary over time. The particular manner in which resources of the cloud-computing environment are provisioned is traditionally executed by a control plane at a regional level. This may be suboptimal with respect to a system that utilizes service cells.

BRIEF SUMMARY

Techniques are provided (e.g., a method, a system, non-transitory computer-readable medium storing code or instructions executable by one or more processors) for provisioning resources of an isolated hosting environments (e.g., a cloud-computing environment referred to as "a service cell") to a user based at least in part on user-defined constraints. Various embodiments are described herein, including methods, systems, non-transitory computer-readable storage media storing programs, code, or instructions executable by one or more processors, and the like.

One embodiment is directed to a method for managing a plurality of isolated hosting environments (e.g., service cells). In some embodiments, each isolated hosting environment comprises a respective management plane and a respective data plane. The respective management plane and the respective data plane may be specific to a given hosting environment and isolated from all other hosting environments of the plurality of hosting environments. The method may further include receiving, by an instant management plane of a particular isolated hosting environment of the plurality of hosting environments, a work request comprising intended state data for an instant data plane of the particular isolated hosting environment. The method may further include storing the intended state data in a data store specific to the particular isolated hosting environment. The method may further include executing one or more orchestration tasks associated with bringing the instant data plane to a state corresponding to the intended state data. The method may further include receiving, by the instant management plane, actual state data indicating a current state of one or more computing nodes of the instant data plane. The method may further include determining, by the instant management plane, a current state of the one or more computing nodes of the instant data plane. In some embodiments, the current state may be determined based at least in part on a comparison between the intended state data and the actual state data. The method may further include providing an indication of the current state of the one or more computing nodes of the instant data plane.

Another embodiment is directed to a cloud-computing system comprising one or more processors and one or more non-transitory computer-readable instructions that, when executed by the one or more processors, cause the cloud-computing system to perform the disclosed methods.

Yet another embodiment is directed to a non-transitory computer-readable storage medium storing computer-executable instructions that, when executed by one or more processors of a computing device, cause the computing device to perform the disclosed methods.

The foregoing, together with other features and embodiments will become more apparent upon referring to the following specification, claims, and accompanying drawings.

BRIEF DESCRIPTION OF THE DRAWINGS

Various embodiments in accordance with the present disclosure will be described with reference to the drawings, in which:

FIG. 4 illustrates an example of intended state data for a DP resource, in accordance with at least one embodiment.

FIG. 5 illustrates an example of actual state data corresponding to a DP resource of a service cell, in accordance with at least one embodiment.

DETAILED DESCRIPTION

Figure 1:
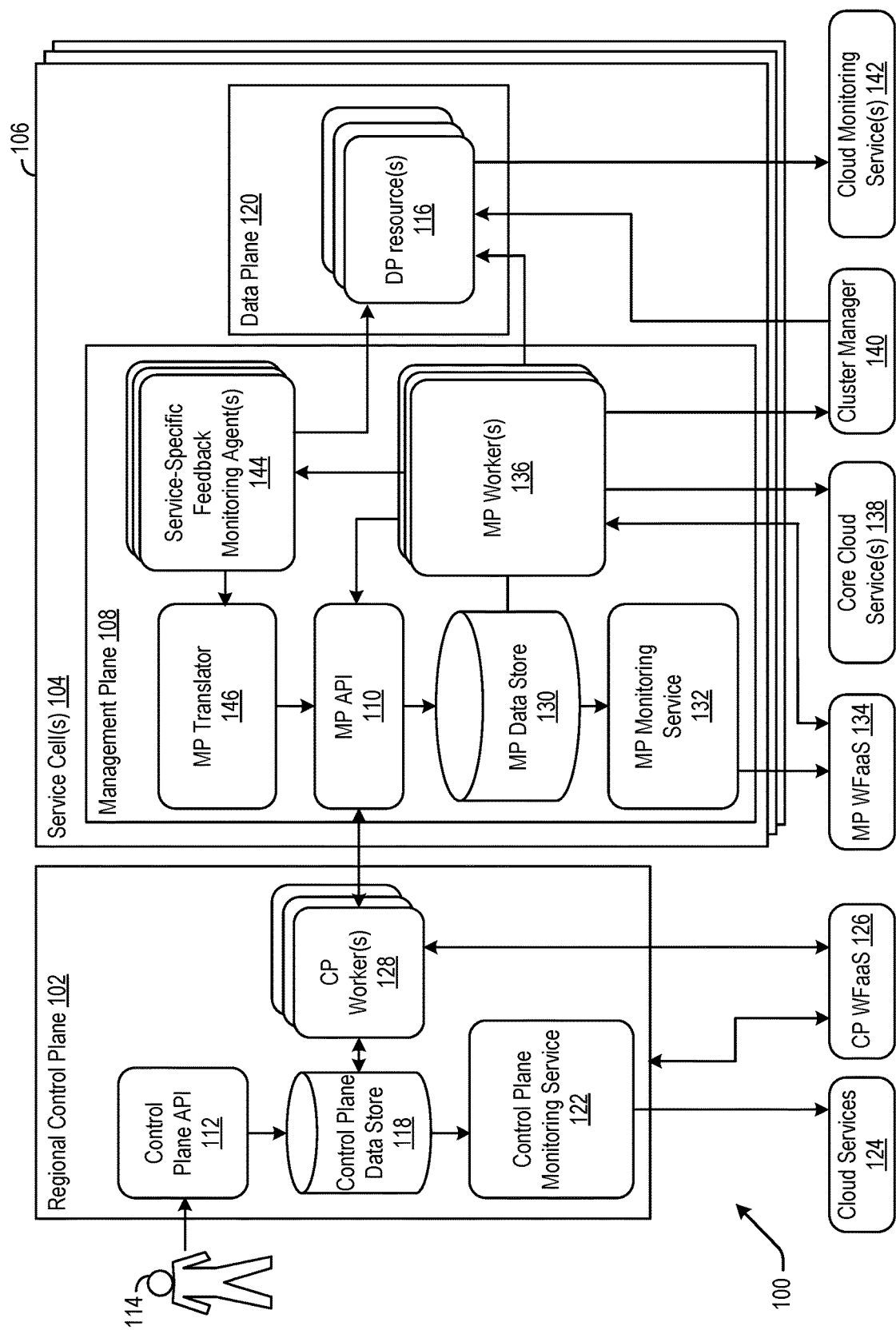
FIG. 1 illustrates an example cloud-computing environment that includes any suitable number of service cells, in accordance with at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to techniques for managing one or more isolated hosting environments. An "isolated hosting environment," sometimes referred to herein as a "service cell," is a hosting environment that is hosted on its own infrastructure. A service cell may be isolated in that it does not share hosts or virtual machines with other service cells. A service cell may include any suitable combination of: a deployment of a management plane codebase, a set of data plane resources (e.g., a computing cluster), a monitoring service, one or more management plane data stores, one or more management plane workflow-as-a-service instances (e.g., a set of worker processes), or the like. Thus, a service cell may be a kind of logical data center (e.g., a logical grouping of performance isolation and fault isolation) within a single availability domain or region. While fault domains protect against issues when a system is being actively changed, service cells may limit the blast radius when a system experiences potentially sever issues, whether or not it is being actively changed. In previous cloud-computing systems, data plane resources (e.g., instances in a computing cluster, etc.) were managed by a regional control plane. Any suitable orchestration tasks (e.g., provisioning, removing, modifying a node of the cluster, etc.) were performed by the regional control plane.

In some embodiments, a management plane of the service cell may be utilized to reconcile an intended state and an actual state of the data plane resource(s) (e.g., a computing cluster) of the service cell. By way of example, a regional control plane may receive intended state data specifying an intended state of the data plane resource(s) of a service cell. The regional control plane may route the intended state data to a management plane of a corresponding service cell. The management plane may identify whether the actual state of the data plane resources of the service cell are aligned with the intended state data received from the regional control plane. If not, the management plane may perform various operations (e.g., create and/or modify one or more computing nodes in the computing cluster) to bring the data plane resources in line with an intended state corresponding to the received intended state data.

The techniques discussed herein provide for an improved management techniques for service cells that enable reconciliation of the data plane resources' actual state with an intended state requested by a user. These techniques may be utilized by a management plane of the service cell that is configured to perform such reconciliation. By utilizing a separate management plane specific to a given service cell, the service cell can be fully isolated in that none of the resources, nor management of said resources, are shared with other service cells. Utilizing the techniques herein enable a regional control plane of the system to operate as a routing later which routes received intended state data received in a request to the appropriate management plane corresponding to a service cell hosting the data plane resources affected by the request. The management (e.g., orchestration, provisioning, deprovisioning, task assignment, etc.) of such data plane resources is provided by a management plane specific to and tightly coupled to a given data plane. By utilizing the management plane specific to a service cell, the processing and complexity of the regional control plane is reduced. Additionally, by utilizing these service cells, a blast radius of a catastrophic failure may be limited to the service cell as a fault boundary onto itself. This decreases, or substantially eliminates, a risk that a failure in one service center affects another service cell of the cloud-computing system.

Moving on to FIG. 1, in which an example cloud-computing environment 100 that includes any suitable number of service cells is illustrated, in accordance with at least one embodiment. Cloud-computing environment 100 may include regional control plane 102 and one or more service cell(s) 104 (of which service cell 106 is an example).

In some embodiments, the regional control plane 102 owns canonical details of all customer-facing service resources. In practice, this also means that the regional control plane 102 may be responsible for accepting work requests that include intended state data that describes an intended state of a set of data plane resources, and sending that information to the management plane 108 (e.g., via MP API 110). The regional control plane 102 may be configured to identify a service cell to which a work request relates. This may entail maintaining a mapping of an identifier (e.g., a data plane identifier (DPID)) for a data plane resource (e.g., a computing cluster) with a particular service cell in which the data plane resource resides.

In some embodiments, the regional control plane 102 may include a control plane API 112. The control plane API 112 may be utilized to receive (e.g., from user 114 via a user device (not depicted)) work requests to create and/or modify data plane resources (e.g., DP resource(s) 116). The DP resources 116 may include, for example, any suitable number of computing nodes corresponding to any suitable number of computing clusters.

In some embodiments, the regional control plane 102 may include a control plane data store 118, which may be configured to store work requests and/or an intended state data corresponding to an intended state of the data plane 120. In some embodiments, the control plane data store 118 may be configured to store the mapping of one or more DPIDs of DP resource(s) 116 with a service cell identifier (SCID) (e.g., a SCID of service cell 106) corresponding to a service cell of the service cell(s) 104. In some embodiments, the service cell(s) 104 may be preconfigured and the regional control plane 102 may be configured to assign a client's resources (e.g., the user 114's DP resources) to a given service cell. An example of such an assignment may be described below in connection with FIG. 3.

The regional control plane 102 may include a control plane monitoring service 122. The control plane monitoring service 122 may be a service that is configured to periodically determine whether an actual state of the service cell(s) 104 matches any received intended state data stored in the control plane data store 118 (e.g., from a previously received work request). Control plane monitoring service may be communicatively coupled to cloud services 124 which may include any suitable number of cloud computing services configured to manage billing, identity, authorization, and the like. In some embodiment, control plane monitoring service 122 may be communicatively coupled to control plane (CP) workflow-as-a-service (WFaaS) 126. The control plane monitoring service 122 may utilize CP WFaaS 126 (e.g., to identify one or more instructions) to initiate one or more workers of CP worker(s) 128 to forward the intended state data to a given management plane (e.g., management plane 108).

In some embodiments, the CP worker(s) 128 may individually be configured to receive intended state data and determine a particular management plane (e.g., management plane 108) as the destination for the intended state data. In some embodiments, the CP worker(s) 128 may access a mapping stored in the control plane data store 118 to determine that a DPID associated with the intended state data corresponds to a particular service cell (e.g., service cell 106) of the service cell(s) 104. In some embodiments, if no DPID exists or an association to a service cell has not already been established, the CP worker(s) 128 may be configured to assign the intended state data to a particular service cell of the service cell(s) 104 utilizing any suitable predefined protocol for assigning data plane resources to a given entity (e.g., the user from which the work request was received). If an assignment is made, the CP worker(s) 128 may be configured to receive a DPID from the management plane 108 and store an association between a given service cell (e.g., service cell 106) and the DPID received. The association may be maintained as part of the mapping in control plane data store 118.

The management plane of a service cell (e.g., an example of which is management plane 108) may include a management plane (MP) application programming interface (API) (e.g., MP API 110) configured to receive work requests and/or intended state data from the CP worker(s) 128 of regional control plane 102. In some embodiments, the MP API 110 may be configured to store the intended state data in MP data store 130, a storage resource configured to store such data.

The management plane 108 may include MP monitoring service 132. MP monitoring service 132 may be configured to periodically (e.g., according to a predetermined frequency, schedule, etc.) determine whether the actual state of a set of DP resources (e.g., one of DP resource(s) 116) corresponds to the intended state data received. The MP monitoring service 132 may be communicatively coupled to MP WFaaS 134. If the actual state of a DP resource (e.g., a computing cluster of the DP resource(s) 116) does not match a state described by the intended state data, the MP monitoring service 132 may be configured to initiate (e.g., using the MP WFaaS 134) a workflow that causes MP worker(s) 136 to execute a workflow to bring the DP resource(s) 116 (e.g., the computing cluster of the DP resource(s) 116) in line with the intended state indicated by the intended state data. The MP WFaaS 134 may be configured to identify the particular workflow with which such a task is to be accomplished, while the MP worker(s) 136 may be configured to execute the workflow identified by the MP WFaaS 134. In some embodiments, the MP worker(s) 136 may provide service-specific orchestration operations. The MP worker(s) 136 may be communicatively coupled to any suitable number of core cloud services (e.g., core cloud service(s) 138 including any suitable combination of a virtual cloud service, a compute service, a storage service, etc.).

In some embodiments, the MP worker(s) 136 may be communicatively coupled to a cluster manager (e.g., cluster manager 140). Cluster manager 140 may be configured to manage any suitable number of computing clusters (e.g., the DP resource(s) 116 which individually are an example of a computing cluster). In some embodiments, the cluster manager 140 may be configured to manage any suitable type of computing cluster (e.g., a Kubernetes cluster, a set of computing nodes used to execute containerized applications, etc.). The MP worker(s) 136 may be configured to execute any suitable operations to cause the cluster manager 140 to execute any suitable orchestration operation on the DP resource(s) 116 in accordance with the instructions identified to bring the DP resource(s) 116 in line with the intended state data. In some embodiments, cloud monitoring service(s) 142 may be communicatively coupled to DP resource(s) 116 and configured to monitor the health of DP resource(s) 116. In some embodiments, cloud monitoring service(s) 142 may be configured to transmit (e.g., to a user device of user 114 using any suitable form of electronic communication) any suitable health data indicating the health of one or more computing nodes of the DP resource(s) 116 (e.g., one or more computing clusters).

In some embodiments, service-specific feedback monitoring agent(s) 144 may be configured to monitor and assess an actual state of the DP resource(s) 116. In some embodiments, this may entail identifying values for actual state data that describes an actual state of the DP resource(s) 116. In some embodiments, the service-specific feedback monitoring agent(s) 144 may be configured to monitor and track computing instance health (e.g., of a computing instance of the DP resource(s) 116). The MP translator 146 may be configured to aggregate the health data (e.g., multiple instances of health data obtained for a given computing node instance) to prevent things like false positives during a network partition, or excessive churn during a large-scale outage. The MP translator 146 may be configured to invoke the MP API to update the actual state data stored at the regional control plane 102. In some embodiments, the CP worker(s) 128 may poll for such data via the MP API 110 (e.g., according to a predefined frequency and/or schedule). The actual state data may be stored at CP data store 118 at any suitable time.

In some embodiments, any suitable combination of the components of the management plane 108 described above, may be implemented by a computing cluster (e.g., a Kubernetes computing cluster) separate from the DP resource(s) 116.

Figure 2:
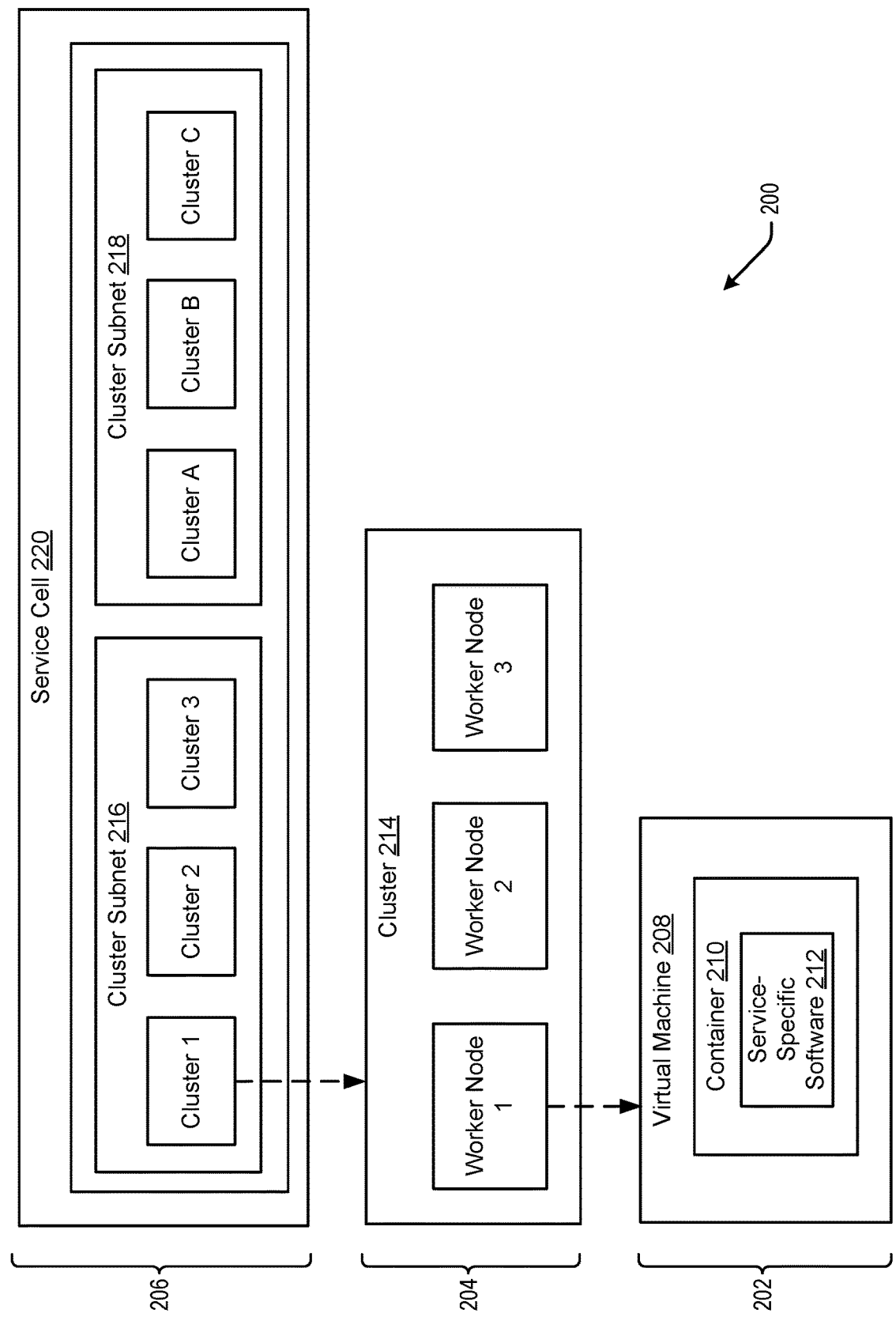
FIG. 2 illustrates a number of components of a cloud-computing system, each of the components corresponding to a particular level of isolation, in accordance with at least one embodiment.

FIG. 2 illustrates a number of components of a cloud-computing environment 200 (an example of the cloud-computing environment 100 of FIG. 1), each of the components corresponding to a particular level of isolation (e.g., level 202, 204, and 206), in accordance with at least one embodiment.

On a given computing node (e.g., a computing node of the DP resource(s) 116 of FIG. 1), there is the potential for arbitrary code execution in some services, so a virtual machine (e.g., a flex shape virtual machine such as virtual machine 208) may be used on each node in conjunction with a container (e.g., container 210) to provide a strong execution and memory/access boundary. The container 210 may be orchestrated by the cluster manager 140 of FIG. 1. The container 210 may be used to execute service-specific software (e.g., service-specific software 212.

Multiple computing nodes (e.g., worker node 1, worker node 2, worker node, 3 etc.) may execute as part of cluster 214 (an example of a DP resource of the DP resource(s) 116). Within level 204 (e.g., a cluster level), the cluster 214 may be isolated from other resources (e.g., other clusters) of the DP resource(s) 116. In some embodiments, cluster 214 may be isolated from other DP resources through the use of cluster subnet 216. By way of example, cluster subnet 216 may include multiple clusters (e.g., cluster 1 corresponding to cluster 214, cluster 2, and cluster 3). In some embodiments, these clusters may correspond to a given client. Similarly, cluster subnet 218 may include cluster A, B, and C, which may be DP resources corresponding to a different client. By utilizing cluster subnets 216 and 218, the corresponding clusters of each subnet may be isolated to prevent cross-client access in the case of a malicious actor gaining control of a host.

At level 206, a service cell 220 (an example of the service cell 106 of FIG. 1) may be utilized to isolate a set of DP resources (e.g., DP resource(s) 116) from other DP resources in other service cells. By utilizing these service cells, outages affecting all clients may be avoided. Rather, an outage of one service cell need only affect the clients having DP resources in that particular service cell, while the DP resources of other service cells remain unaffected.

Figure 3:
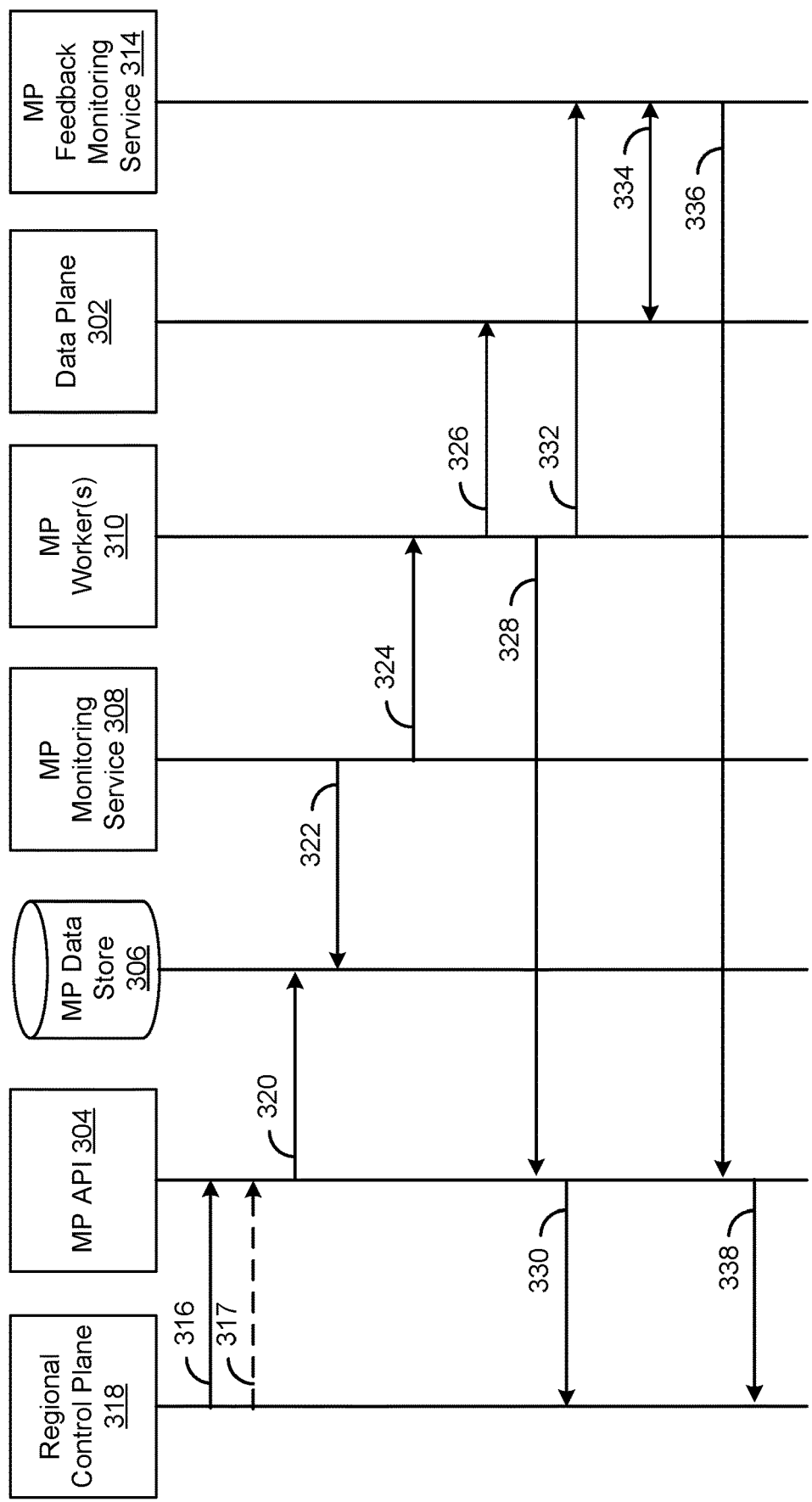
FIG. 3 illustrates an example flow for updating a data plane of a service cell utilizing a management plane specific to the service cell, in accordance with at least one embodiment.

FIG. 3 illustrates an example flow 300 for updating a data plane component (e.g., a DP resource of the DP resource(s) 116 of FIG. 1) of a service cell (e.g., service cell 106 of FIG. 1) utilizing a management plane (e.g., the management plane 108 of FIG. 1) specific to the service cell, in accordance with at least one embodiment.

The management plane 108 may include, but is not limited to, management plane (MP) API 304, MP data store 306 (an example of the MP data store 130 of FIG. 1), MP monitoring service 308 (an example of the MP monitoring service 132 of FIG. 1), MP worker(s) 310 (an example of the MP worker(s) 136 of FIG. 1), and MP feedback monitoring service 314 (an example of the service-specific feedback monitoring agent(s) 144 of FIG. 1).

The flow 300 may begin at 316, where regional control plane 318 (an example of the regional control plane 102 of FIG. 1), may receive (e.g., via control plane API 112 of FIG. 1), a work request. In some embodiments, the work request may include intended state data.

FIG. 4 illustrates an example of intended state data 400 for a DP resource (e.g., a computing cluster of the DP resource(s) 116 of FIG. 1), in accordance with at least one embodiment.

As depicted in FIG. 4, intended state data 400 includes an identifier (e.g., identifier 402) by which the cluster may be referred. Intended state data 400 may further include an endpoint identifier (e.g., endpoint identifier 404) with which an endpoint of the cluster may be accessed). A virtual cloud network (VCN) identifier (e.g., VCN identifier 406) may be included to identify a VCN for the cluster.

Any suitable number of nodes may be identified within intended state data 400. As depicted the intended state data 400 includes three nodes represented by node data 408, 410, and 412. As depicted in FIG. 4, any suitable number of nodes may be defined within an array (as depicted at 414) or via any suitable techniques and/or container. An instance of node data (e.g., node data 408, node data 410, node data 412, etc.) may include any suitable number of parameters. These parameters may define attributes of the node requested including, but not limited to, an identifier for the node, an availability domain corresponding to the node, a shape corresponding to the node, a number of processing units of the node, an amount of random access memory (RAM) of the node, an amount of disk memory, a role (e.g., a data node, a master node, etc.), a status (e.g., healthy), or the like.

Intended state data 400 may include any suitable number of parameters defining the software to be executed on the one or more nodes. By way of example, software data 414 may include parameters defining aspects of the software such as a type (e.g., "elasticsearch"), a version (e.g., "7.9.0"), and/or any suitable configuration data corresponding to the software to be executed at the node(s).

Returning to FIG. 3, the regional control plane 318 may receive a work request via the CP API 112 and store the intended state data of the work request within control plane data store 118 of FIG. 1. As discussed above, control plane monitoring service 122 may monitor the control plane data store 118 to determine whether intended state data exists which does not match actual state data. If the control plane monitoring service 122 identifies that the cluster corresponding to the work request does not exist and/or has not been assigned (e.g., based at least in part on identifying that a cluster with the cluster identifier of the intended state data received does not exist, or based at least in part on identifying that there actual state data corresponding to the intended state data does not exist or does not match the intended state data received), the control plane monitoring service 122 may execute operations to cause the CP WFaaS 126 to assign a number of CP worker(s) 128 of FIG. 1 the task of forwarding the intended state data to a corresponding service cell (e.g., service cell 106). In some embodiments, if the work request corresponds to a cluster that has not yet been assigned to a service cell, the CP worker(s) 128 may be configured to execute any suitable operations to assign the requested cluster to a particular service cell of the service cell(s) 104. The assignment may be performed in any suitable manner. As a non-limiting example, a bin packing algorithm may be utilized to assign a requested cluster to the service cell 106. Any suitable predefined protocol for cluster assignment may be utilized by the CP worker(s) 128. Some rules of the predefined protocol may cause clusters corresponding to a common client to be assigned to the same service cell (e.g., to collocate the client's resources) or different service cells (e.g., to distribute the client's resources).

If the CP worker(s) 128 assigned to the task determine that a mapping (e.g., a mapping stored within control plane data store 118) includes an association between the cluster identifier within the intended state data and a particular service cell (e.g., service cell 106), the CP worker(s) 128 may execute any suitable operations to forward the intended state data to that service cell. If an association between the cluster identifier and a particular service cell does not exist, the CP worker(s) 128 may assign the cluster to a particular service cell as described above and may update the mapping to include an association between the cluster identifier and the service cell assigned (e.g., via an service cell identifier that is unique to the service cell).

In either scenario, the CP worker(s) 128 of the regional control plane 318 may forward the intended state data to the MP API 304 (e.g., the MP API of the assigned service cell, such as MP API 110). By way of example, the CP worker(s) 128 may send a PUT command to the MP API with the intended state data 400 of FIG. 4, defining three nodes (e.g., two data nodes and a master node spread across three availability domains connected to the client's VCN). In some embodiments, the CP worker(s) 128 of regional control plane 318 may thereafter periodically send GET request to the MP API 304 at 317 which check the status of the requested cluster until the intended state is achieved or is marked as failed. In some embodiments, the CP worker(s) 128 may determine that state data is needed. For example, the CP Worker may periodically poll the management plane to check if the actual state now meets the intended state for that work request. This will involve comparing the portion of the actual state returned by the MP API 304 with the fields in the original request. In some embodiments, only a portion of the actual and/or intended state data is compared because multiple requests could be processed by the MP asynchronously before the response is returned to the CP.

At 320, the MP API 304 may receive the request and persists the intended state data in MP data store 306. In some embodiments, the intended state data is persisted as a new resource record within MP data store 306.

At 322, MP monitoring service 308, which is configured to scan the MP data store 306 periodically (e.g., according to a predefined frequency and/or schedule) may identify the new resource record/intended state data. Upon identifying the existence of the intended state data, the MP monitoring service 308 may execute operations to cause MP worker(s) 310 to receive the intended state data at 324. By way of example, the MP monitoring service 308 may determine that the intended state data has no corresponding actual state data and in response to this determination, the MP monitoring service 308 may trigger a workflow to be created (e.g., by the MP WFaaS 134, a service configured to create such workflows based on intended state data). In some embodiments, the MP monitoring service 308 may pass along the intended state data (or any suitable portion of the intended state data) as arguments (e.g., to the MP WFaaS 134) which may cause MP worker(s) 310 to be assigned to execute the operations of the workflow in accordance with the intended state data.

At 326, one or more of the MP worker(s) 310 may obtain the workflow, read the intended state from the argument and execute any suitable call to any suitable component (e.g., core cloud service(s) 138 and/or cluster manager 140 of FIG. 1) to create the cluster (or modify the cluster if the cluster has already been created). In some embodiments, transient information may be persisted from step-to-step via a workflow state.

At 328, as resources come online, the MP worker(s) 310 may send (e.g., via PATCH request) to the MP API 304 actual state data reflecting the current state of the cluster.

FIG. 5 illustrates an example of actual state data 500 corresponding to a DP resource of a service cell, in accordance with at least one embodiment.

As depicted in FIG. 5, actual state data 500 includes an identifier (e.g., identifier 502) which, in this example, corresponds to the identifier 402 of FIG. 4. Through this identifier, the actual state data 500 may be determined to correspond to the intended state data 400 of FIG. 4.

Any suitable number of nodes may be identified within actual state data 500. As depicted in FIG. 5, a single node may have come online with node data 504 corresponding to the attributes of that node. By way of example, the node data 504 may correspond to actual data (e.g., current attributes) associated with a node brought online due to the node data 408 of FIG. 4. Actual data corresponding suitable number of nodes may be defined within an array (as depicted at 414) or via any suitable techniques and/or container. An instance of actual node data (e.g., node data 504, etc.) may include any suitable number of parameters. These parameters may define attributes of the node requested including, but not limited to, an identifier for the node, an availability domain corresponding to the node, a shape corresponding to the node, a number of processing units of the node, an amount of random access memory (RAM) of the node, an amount of disk memory, a role (e.g., a data node, a master node, etc.), a status (e.g., healthy), or the like.

Actual state data 500 may include any suitable metadata (e.g., metadata 506), including any suitable number of parameters which may be tracked internally within the cloud-computing environment but which are hidden from the client. For example, metadata 508 may include any suitable number of identifiers such as identifiers corresponding to a VCN, subnet, network security group, cluster, or the like. These identifiers may be assigned by components of the cloud-computing environment (e.g., core cloud service(s) 138, cluster manager 140, etc.) and may refer to the cluster itself and/or components associated with the cluster such as a VCN, subnet, network security group, etc. Metadata 506 may include metadata 510 which may include any suitable number of attributes corresponding to the node(s) of the cluster. By way of example, metadata 506 may include internal identifiers assigned to the node by various components of the cloud-computing environment (e.g., core cloud service(s) 138, cluster manager 140, etc.). Metadata 506 may include metadata 512 which may include any suitable number of attributes corresponding to the one or more load balancers of the cluster. By way of example, metadata 512 may include internal identifiers assigned to the one or more node balancers by various components of the cloud-computing environment (e.g., core cloud service(s) 138, cluster manager 140, etc.)

Returning to FIG. 3, as resources come online, the MP worker(s) 310 may transmit (e.g., via one or more PATCH requests) the actual state data (e.g., actual state data 500 of FIG. 5) to the MP API 304 at 328, which in turn, transmits the actual state data received to the regional control plane at 330. In some embodiments, the actual state data is persisted within MP data store 306 (e.g., by the MP worker(s) 310 or the MP API 304). In some embodiments, the MP API 304 transmits to the regional control plane 318 the actual state date known at the time to the regional control plane 318 in response to receiving a request for the data as described at 317.

At 332, the MP worker(s) 310 may configure one or more monitoring agents of the MP feedback monitoring service 314 to monitor the DP resource (e.g., the cluster) of the data plane 302.

At 334, the MP feedback monitoring service 314, through its monitoring, may obtain actual state data corresponding to the one or more nodes requested via the intended state data 400 of FIG. 4. The MP feedback monitoring service 314 may transmit (e.g., via one or more PATCH requests) the actual state data of the nodes at 336 to the MP API 304, which in turn, may transmit the actual state data received to the regional control plane at 338. Although not depicted in FIG. 3, the actual state data may be aggregated by the MP translator 146 of FIG. 1, which in turn may transmit the actual state data once aggregate for all nodes. In some embodiments, the actual state data is persisted within MP data store 306 (e.g., by the MP feedback monitoring service 314 or the MP API 304). In some embodiments, the MP API 304 transmits to the regional control plane 318 the actual state date known at the time to the regional control plane 318 in response to receiving a request for the data as described at 317. In some embodiments, the actual state data transmitted at 330 and/or 338 may exclude the metadata 506 of FIG. 5.

The regional control plane 318 (e.g., the CP worker which was periodically polling for updates) may identify when the actual state of the cluster has converged with the intended state as defined by the intended state data 400. In response, the regional control plane 318 may indicate the DP resource is "active" and marks the corresponding work request with the CP data store as complete.

At any suitable time (e.g., upon the DP resource being marked "active", by request of the client, etc.) the regional control plane 318 may be configured to send information indicating the statue of the DP resource to the client.

In the case of an error, or in case the actual and intended state does not converge within a timeout threshold, the work request can be marked by the regional control plane 318 as failed. A reconciliation process (either automatic or human-driven) can be executed to determine the root cause of the failure and one or more remedial actions may be executed to resolve the issue. For example, an outage in a dependency on a core service may prevent the request from being fulfilled within a predefined timeframe, but once the outage is resolved the state can be reconciled. Other failures may be irreconcilable, such as a poorly validated input that allows an impossible value to get into the intended state.

It should be appreciated that work request may be executed asynchronously, but could be executed in the order they are received. The MP is designed to achieve a consistent state, but it may not do that in the order that the requests are submitted depending on the nature of those requests and what the optimal order of operations is. In some embodiments, the control plane may limit asynchronous operations that generate work requests to one at a time per cluster. As an example, if a client requests a cluster resize, and then requests another resize or an upgrade operation, the second request may result in an error response indicating that an operation is already in progress and that they should retry their request when the previous operation completes. In some embodiments, the MP may identify operations which can be safely parallelized, or which are safe for the MP to merge, such that customer requests are accepted the majority of the time, but may take longer to fully reconcile.

It should be appreciated that, in the ongoing example, should the user with to remove a node from the DP resource, a new intended state may be provided to the regional control plane 318 which excludes a previously included node. In some embodiments, intended state data which includes no nodes may be considered a request to deprovision the DP resource entirely.

Figure 6:
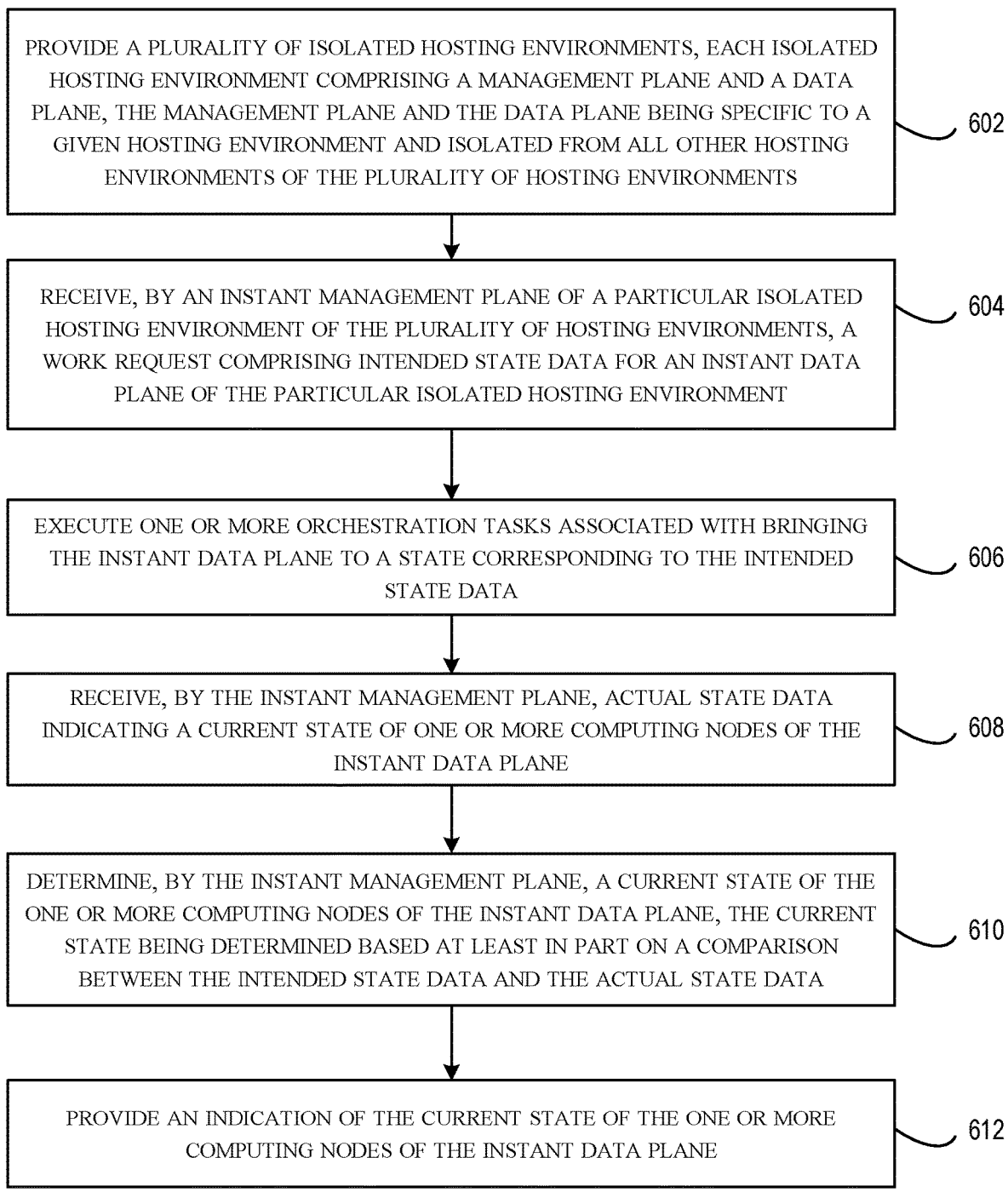
FIG. 6 is a block diagram illustrating an example method for managing a plurality of isolated hosting environments (e.g., service cells), in accordance with at least one embodiment.

FIG. 6 is a block diagram illustrating an example method 600 for managing a plurality of isolated hosting environments (e.g., service cells), in accordance with at least one embodiment. The method 600 may be performed, in whole or in part, by the management plane xxx of FIG. 1, operating as part of at least one of the cloud-computing patterns of FIGS. 7-11.

The method 600 may begin at 602, where a plurality of isolated hosting environments (e.g., the service cell(s) 104) is provided (e.g., in cloud-computing environment 100 of FIG. 1). In some embodiments, each isolated hosting environment comprises a management plane (e.g., management plane 108 of FIG. 1) and a data plane (e.g., data plane 120 of FIG. 1). In some embodiments, the management plane and the data plane are specific to a given hosting environment (e.g., a specific service cell such as service cell 106) and isolated from all other hosting environments of the plurality of hosting environments (e.g., isolated from other service cells of the service cell(s) 104)

At 604, a work request comprising intended state data (e.g., intended state data 400 of FIG. 4) for an instant data plane (e.g., data plane 120) of the particular isolated hosting environment (e.g., service cell 106) is received by an instant management plane (e.g., management plane 108) of a particular isolated hosting environment (e.g., service cell 106) of the plurality of hosting environments. In some embodiments, the intended state data may correspond to a particular data plane resource (e.g., a particular cluster of DP resource(s) 116 of FIG. 1).

At 606, one or more orchestration tasks associated with bringing the instant data plane to a state corresponding to the intended state data may be executed. By way of example, MP worker(s) 136 may execute any suitable orchestration tasks (e.g., for provisioning, deprovisioning, configuring, installing software, etc.) any suitable number of components (e.g., computing nodes, etc.) of the DP resource(s) 116. By way of example, DP resource(s) 116 may include any suitable number of clusters (e.g., clusters 1, 2, 3, A, B, and C of FIG. 2). The MP worker(s) 136 may instantiate and/or configure any suitable number of virtual machines (e.g., virtual machine 208 of FIG. 2), containers (e.g., container 210 of FIG. 2), service-specific software (e.g., service-specific software 212 of FIG. 1), for any suitable number of computing nodes (e.g., worker nodes 1, 2, and 3, of FIG. 2).

At 608, actual state data (e.g., actual state data 500 of FIG. 5, or some portion of actual state data 500 of FIG. 5) may be received by the instant management plane (e.g., the management plane 108 of FIG. 1). In some embodiments, the actual state data indicates a current state of one or more computing nodes of the instant data plane (e.g., worker node 1 of FIG. 1, one of the computing nodes of a DP resource (e.g., cluster 214 of FIG. 2) of DP resource(s) 116 of FIG. 1).

At 610, a current state of the one or more computing nodes of the instant data plane is determined (e.g., by the MP worker(s) 136, by the service-specific feedback monitoring agent(s) 144 of FIG. 1 instant management plane). In some embodiments, the current state is determined based at least in part on a comparison between the intended state data and the actual state data. In some embodiments, the current state is determined based at least in part on monitoring the resources (e.g., DP resource(s) 116) of the instant data plane.

At 610, an indication of the current state of the one or more computing nodes of the instant data plane may be provided. By way of example, the actual state data and/or an aggregation of the actual state data corresponding to the one or more computing nodes of the instant data plane may be provided to the regional control plane 102 of FIG. 1 (an example of the regional control plane 318 of FIG. 3).

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
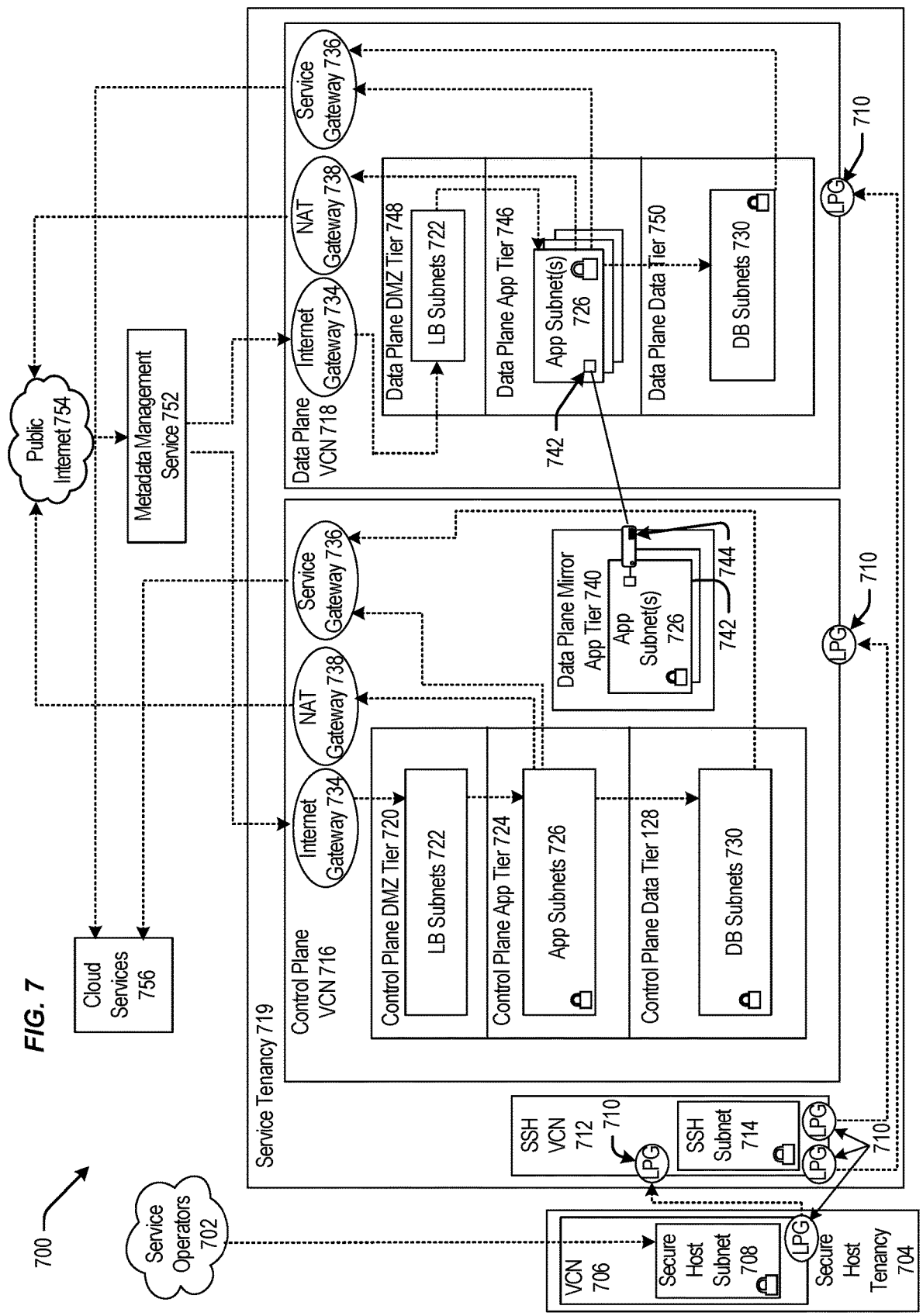
FIG. 7 is a block diagram illustrating a pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Memory that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
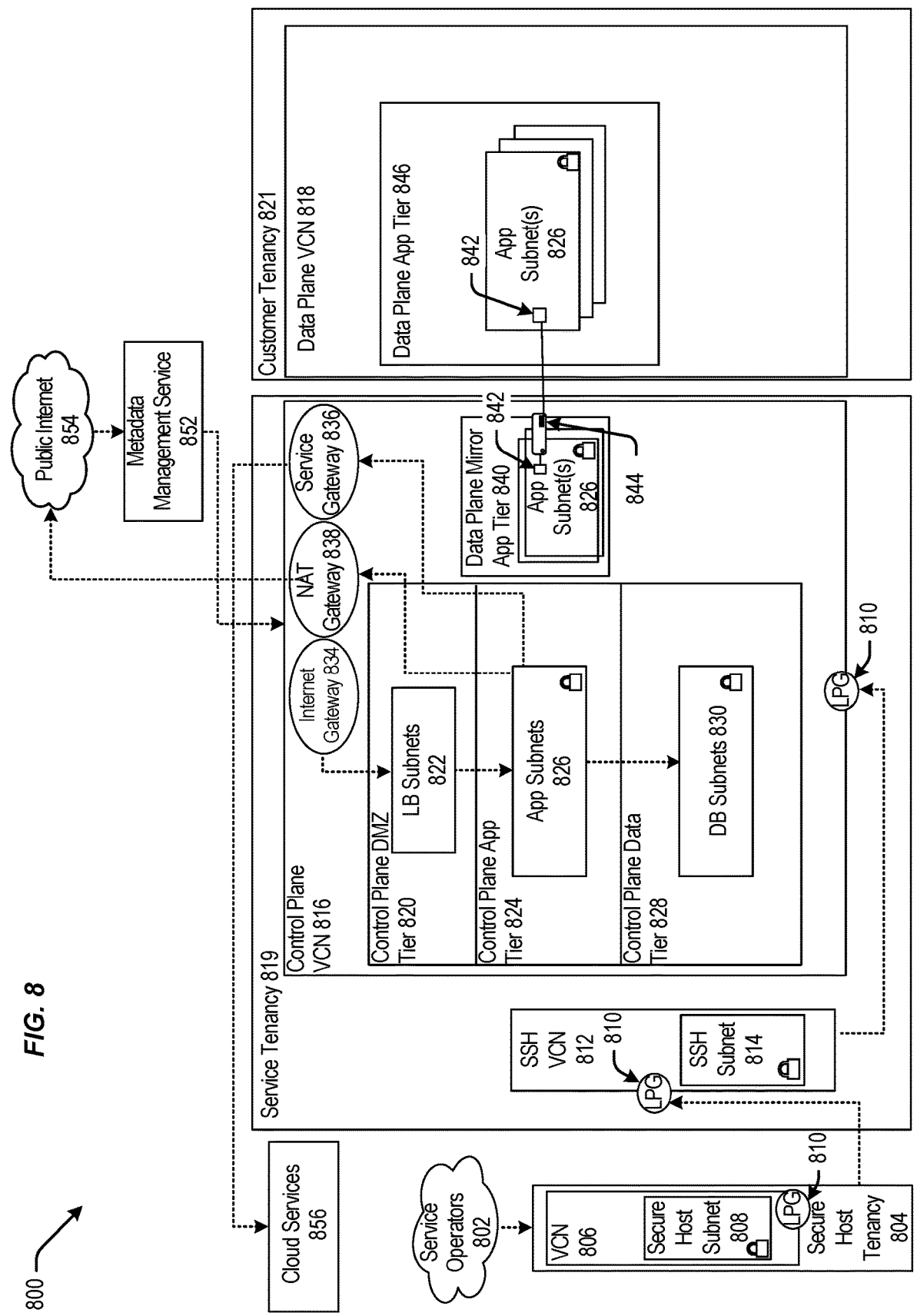
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 702 of FIG. 7) can be communicatively coupled to a secure host tenancy 804 (e.g. the secure host tenancy 704 of FIG. 7) that can include a virtual cloud network (VCN) 806 (e.g. the VCN 706 of FIG. 7) and a secure host subnet 808 (e.g. the secure host subnet 708 of FIG. 7). The VCN 806 can include a local peering gateway (LPG) 810 (e.g. the LPG 710 of FIG. 7) that can be communicatively coupled to a secure shell (SSH) VCN 812 (e.g. the SSH VCN 712 of FIG. 7) via an LPG 710 contained in the SSH VCN 812. The SSH VCN 812 can include an SSH subnet 814 (e.g. the SSH subnet 714 of FIG. 7), and the SSH VCN 812 can be communicatively coupled to a control plane VCN 816 (e.g. the control plane VCN 716 of FIG. 7) via an LPG 810 contained in the control plane VCN 816. The control plane VCN 816 can be contained in a service tenancy 819 (e.g. the service tenancy 719 of FIG. 7), and the data plane VCN 818 (e.g. the data plane VCN 718 of FIG. 7) can be contained in a customer tenancy 821 that may be owned or operated by users, or customers, of the system.

The control plane VCN 816 can include a control plane DMZ tier 820 (e.g. the control plane DMZ tier 720 of FIG. 7) that can include LB subnet(s) 822 (e.g. LB subnet(s) 722 of FIG. 7), a control plane app tier 824 (e.g. the control plane app tier 724 of FIG. 7) that can include app subnet(s) 826 (e.g. app subnet(s) 726 of FIG. 7), a control plane data tier 828 (e.g. the control plane data tier 728 of FIG. 7) that can include database (DB) subnet(s) 830 (e.g. similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g. the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g. the service gateway of FIG. 7) and a network address translation (NAT) gateway 838 (e.g. the NAT gateway 738 of FIG. 7). The control plane VCN 816 can include the service gateway 836 and the NAT gateway 838.

The control plane VCN 816 can include a data plane mirror app tier 840 (e.g. the data plane mirror app tier 740 of FIG. 7) that can include app subnet(s) 826. The app subnet(s) 826 contained in the data plane mirror app tier 840 can include a virtual network interface controller (VNIC) 842 (e.g. the VNIC of 742) that can execute a compute instance 844 (e.g. similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g. the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g. the metadata management service 752 of FIG. 7) that can be communicatively coupled to public Internet 854 (e.g. public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g. cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
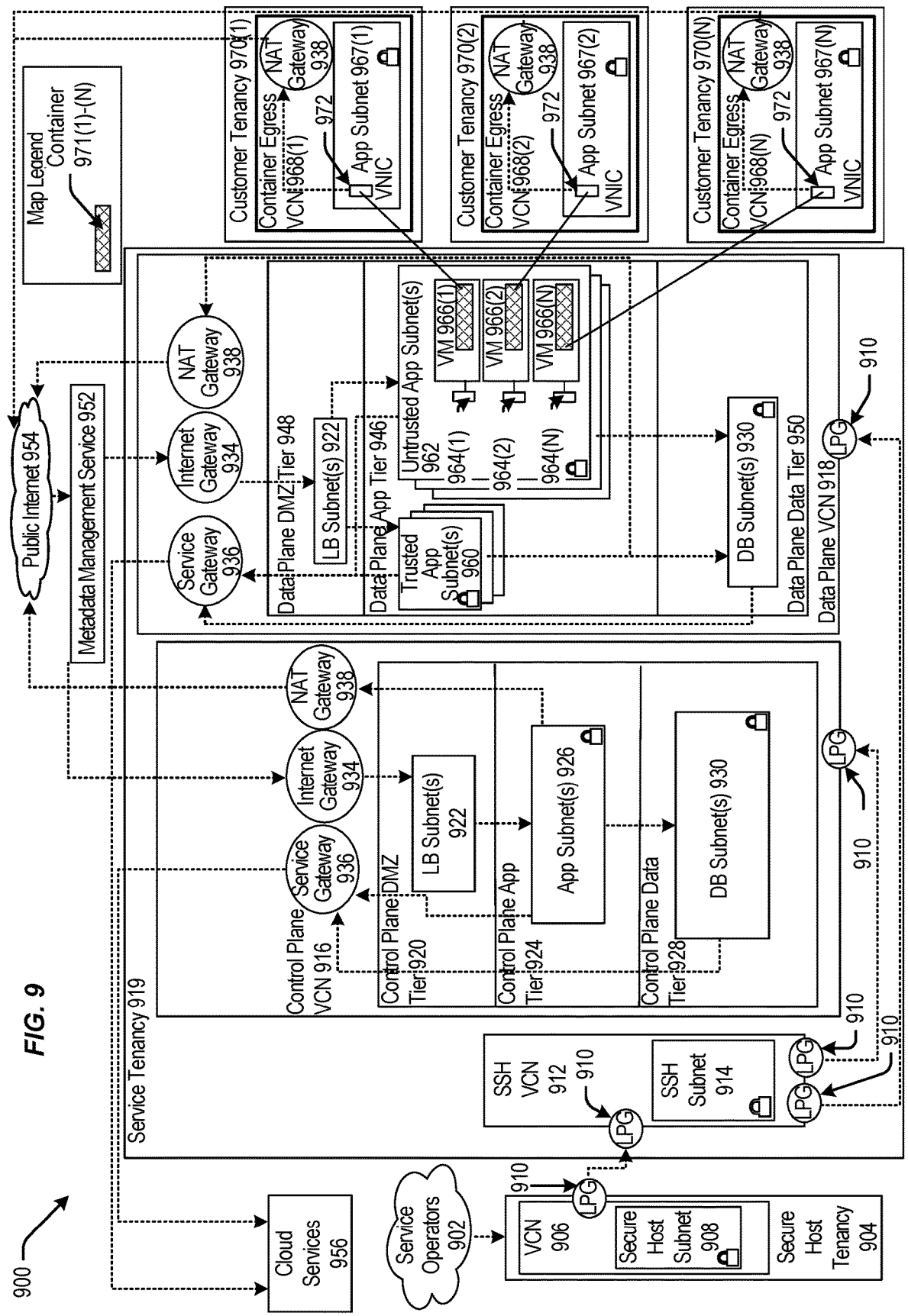
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 702 of FIG. 7) can be communicatively coupled to a secure host tenancy 904 (e.g. the secure host tenancy 704 of FIG. 7) that can include a virtual cloud network (VCN) 906 (e.g. the VCN 706 of FIG. 7) and a secure host subnet 908 (e.g. the secure host subnet 708 of FIG. 7). The VCN 906 can include an LPG 910 (e.g. the LPG 710 of FIG. 7) that can be communicatively coupled to an SSH VCN 912 (e.g. the SSH VCN 712 of FIG. 7) via an LPG 910 contained in the SSH VCN 912. The SSH VCN 912 can include an SSH subnet 914 (e.g. the SSH subnet 714 of FIG. 7), and the SSH VCN 912 can be communicatively coupled to a control plane VCN 916 (e.g. the control plane VCN 716 of FIG. 7) via an LPG 910 contained in the control plane VCN 916 and to a data plane VCN 918 (e.g. the data plane 718 of FIG. 7) via an LPG 910 contained in the data plane VCN 918. The control plane VCN 916 and the data plane VCN 918 can be contained in a service tenancy 919 (e.g. the service tenancy 719 of FIG. 7).

The control plane VCN 916 can include a control plane DMZ tier 920 (e.g. the control plane DMZ tier 720 of FIG. 7) that can include load balancer (LB) subnet(s) 922 (e.g. LB subnet(s) 722 of FIG. 7), a control plane app tier 924 (e.g. the control plane app tier 724 of FIG. 7) that can include app subnet(s) 926 (e.g. similar to app subnet(s) 726 of FIG. 7), a control plane data tier 928 (e.g. the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g. the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 7) and a network address translation (NAT) gateway 938 (e.g. the NAT gateway 738 of FIG. 7). The control plane VCN 916 can include the service gateway 936 and the NAT gateway 938.

The data plane VCN 918 can include a data plane app tier 946 (e.g. the data plane app tier 746 of FIG. 7), a data plane DMZ tier 948 (e.g. the data plane DMZ tier 748 of FIG. 7), and a data plane data tier 950 (e.g. the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g. public Internet 754 of FIG. 7).

The Internet gateway 934 contained in the control plane VCN 916 and contained in the data plane VCN 918 can be communicatively coupled to a metadata management service 952 (e.g. the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
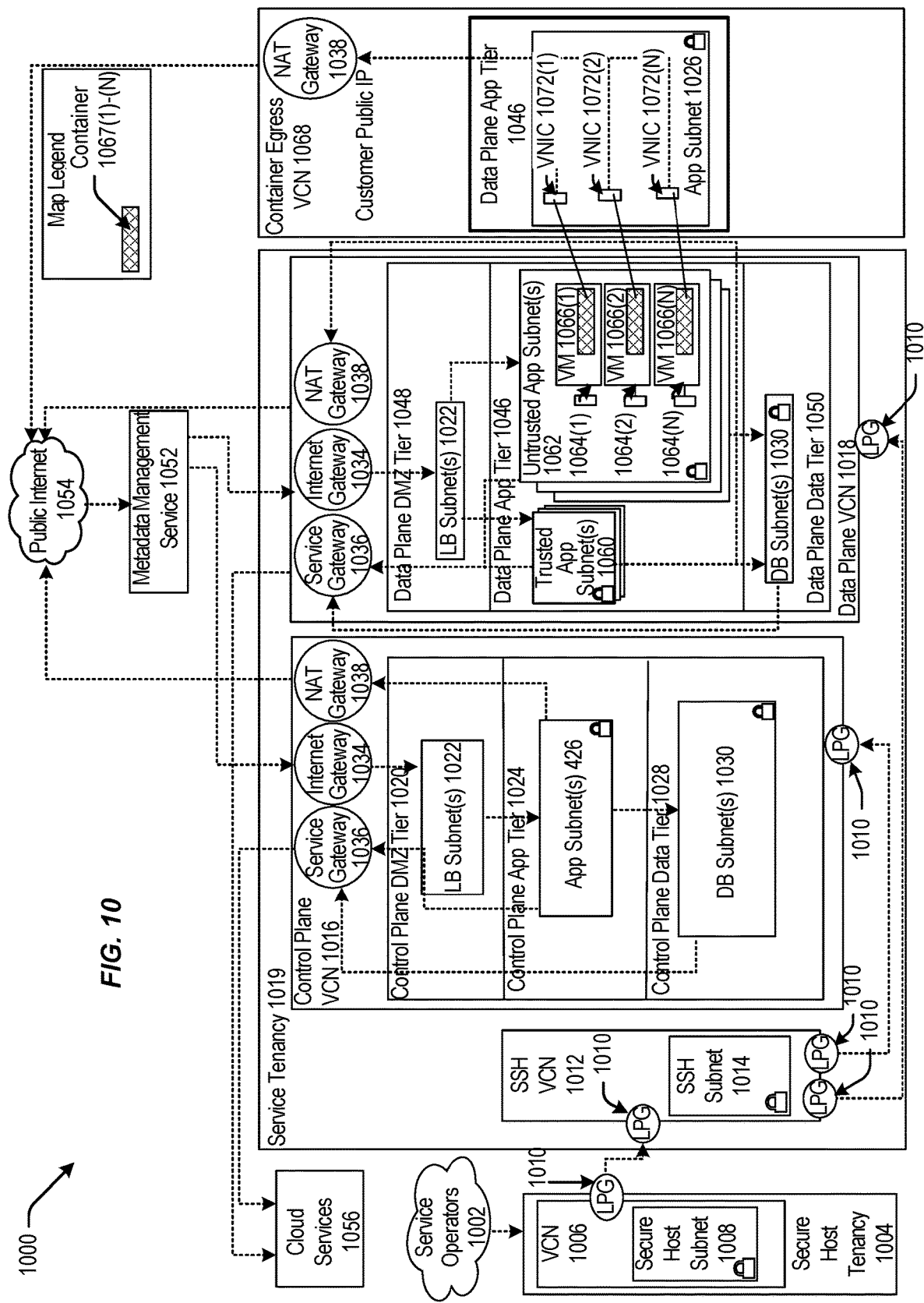
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 702 of FIG. 7) can be communicatively coupled to a secure host tenancy 1004 (e.g. the secure host tenancy 704 of FIG. 7) that can include a virtual cloud network (VCN) 1006 (e.g. the VCN 706 of FIG. 7) and a secure host subnet 1008 (e.g. the secure host subnet 708 of FIG. 7). The VCN 1006 can include an LPG 1010 (e.g. the LPG 710 of FIG. 7) that can be communicatively coupled to an SSH VCN 1012 (e.g. the SSH VCN 712 of FIG. 7) via an LPG 1010 contained in the SSH VCN 1012. The SSH VCN 1012 can include an SSH subnet 1014 (e.g. the SSH subnet 714 of FIG. 7), and the SSH VCN 1012 can be communicatively coupled to a control plane VCN 1016 (e.g. the control plane VCN 716 of FIG. 7) via an LPG 1010 contained in the control plane VCN 1016 and to a data plane VCN 1018 (e.g. the data plane 718 of FIG. 7) via an LPG 1010 contained in the data plane VCN 1018. The control plane VCN 1016 and the data plane VCN 1018 can be contained in a service tenancy 1019 (e.g. the service tenancy 719 of FIG. 7).

The control plane VCN 1016 can include a control plane DMZ tier 1020 (e.g. the control plane DMZ tier 720 of FIG. 7) that can include LB subnet(s) 1022 (e.g. LB subnet(s) 722 of FIG. 7), a control plane app tier 1024 (e.g. the control plane app tier 724 of FIG. 7) that can include app subnet(s) 1026 (e.g. app subnet(s) 726 of FIG. 7), a control plane data tier 1028 (e.g. the control plane data tier 728 of FIG. 7) that can include DB subnet(s) 1030 (e.g. DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 7) and a network address translation (NAT) gateway 1038 (e.g. the NAT gateway 738 of FIG. 7). The control plane VCN 1016 can include the service gateway 1036 and the NAT gateway 1038.

The data plane VCN 1018 can include a data plane app tier 1046 (e.g. the data plane app tier 746 of FIG. 7), a data plane DMZ tier 1048 (e.g. the data plane DMZ tier 748 of FIG. 7), and a data plane data tier 1050 (e.g. the data plane data tier 750 of FIG. 7). The data plane DMZ tier 1048 can include LB subnet(s) 1022 that can be communicatively coupled to trusted app subnet(s) 1060 (e.g. trusted app subnet(s) 960 of FIG. 9) and untrusted app subnet(s) 1062 (e.g. untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet(s) 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g. public Internet 754 of FIG. 7).

The Internet gateway 1034 contained in the control plane VCN 1016 and contained in the data plane VCN 1018 can be communicatively coupled to a metadata management service 1052 (e.g. the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
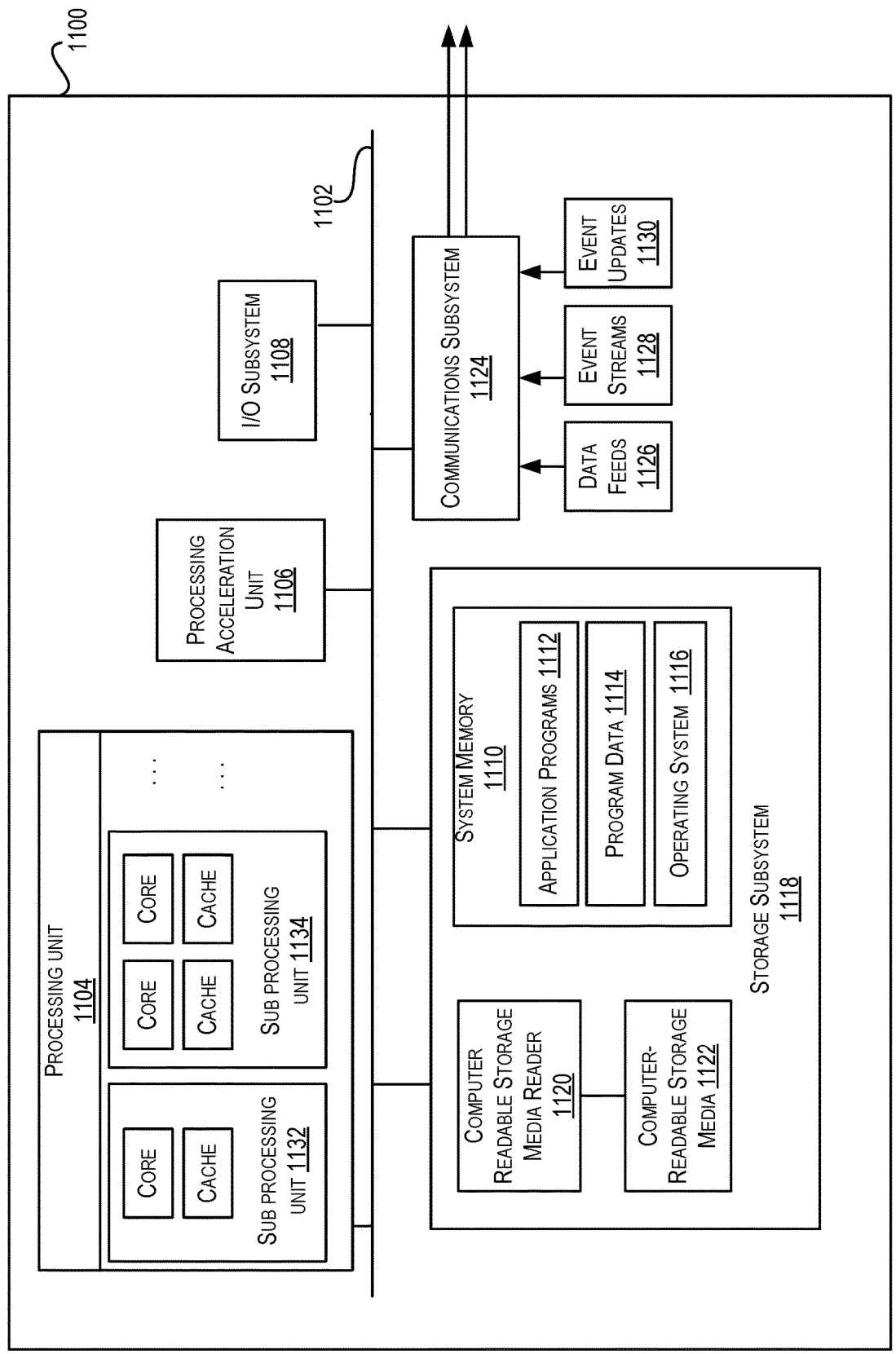
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 11 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   receiving, by a management plane operating within an isolated hosting environment of a cloud-computing environment from a control plane associated with a region of the cloud-computing environment, intended state data corresponding to a data plane resource of the isolated hosting environment, the isolated hosting environment being isolated from one or more other hosting environments of the cloud-computing environment;
   obtaining, by the management plane, first state data associated with the data plane resource, the first state data indicating a first state of the data plane resource;
   in response to identifying a difference between the first state data and the intended state data, executing, by the management plane, one or more orchestration tasks associated with bringing the data plane resource to an intended state corresponding to the intended state data;
   obtaining, by the management plane, second state data associated with the data plane resource, the second state data indicating a second state of the data plane resource;
   identifying, by the management plane and based at least in part on the second state data associated with the data plane resource, that the data plane resource is in the intended state corresponding to the intended state; and
   providing, by the management plane to the control plane, an indication that the data plane resource is in the intended state based at least in part on updating, by the management plane, actual state data corresponding to the data plane resource and stored in the control plane.

2. The computer-implemented method of claim 1, wherein executing the one or more orchestration tasks causes the data plane resource to be configured according to the intended state data.

3. The computer-implemented method of claim 1, wherein the management plane operates as a computing cluster comprising a plurality of computing nodes.

4. The computer-implemented method of claim 1, wherein the management plane identifies the one or more orchestration tasks associated with bringing the data plane resource to the intended state corresponding to the intended state data.

5. The computer-implemented method of claim 1, further comprising assigning, by the management plane, a monitoring agent to monitor health data of the data plane resource.

6. A cloud-computing system, comprising:
   one or more processors of a management plane operating within an isolated hosting environment of a cloud-computing environment, the isolated hosting environment being isolated from one or more other hosting environments of the cloud-computing environment; and
   one or more memories storing computer-executable instructions that, when executed with the one or more processors, cause the one or more processors to:
      receive, from a control plane associated with a region of the cloud-computing environment, intended state data corresponding to a data plane resource of the isolated hosting environment;
      obtain first state data associated with the data plane resource, the first state data indicating a first state of the data plane resource;

in response to identifying a difference between the first state data and the intended state data, execute one or more orchestration tasks associated with bringing the data plane resource to an intended state corresponding to the intended state data;

obtain second state data associated with the data plane resource, the second state data indicating a second state of the data plane resource;

identify, based at least in part on the second state data associated with the data plane resource, that the data plane resource is in the intended state corresponding to the intended state; and provide, to the control plane, an indication that the data plane resource is in the intended state based at least in part on updating, by the management plane, actual state data corresponding to the data plane resource and stored in the control plane.

7. The cloud-computing system of claim 6, wherein executing the one or more orchestration tasks causes the data plane resource to be configured according to the intended state data.

8. The cloud-computing system of claim 6, wherein the one or more processors of the management plane operate as part of a computing cluster comprising a plurality of computing nodes.

9. The cloud-computing system of claim 6, wherein the one or more processors of the management plane identify the one or more orchestration tasks associated with bringing the data plane resource to the intended state corresponding to the intended state data.

10. The cloud-computing system of claim 6, wherein executing the computer-executable instructions further causes the one or more processors of the management plane to assign a monitoring agent to monitor health data of the data plane resource.

11. A non-transitory computer-readable medium comprising executable instructions that, when executed with one or more processors of a management plane operating within an isolated hosting environment of a cloud-computing environment, causes the one or more processors of the management plane to:

receive, by the one or more processors of the management plane operating within the isolated hosting environment of the cloud-computing environment from a control plane associated with a region of the cloud-computing environment, intended state data corresponding to a data plane resource of the isolated hosting environment, the isolated hosting environment being isolated from one or more other hosting environments of the cloud-computing environment;

obtain first state data associated with the data plane resource, the first state data indicating a first state of the data plane resource;

in response to identifying a difference between the first state data and the intended state data, execute one or more orchestration tasks associated with bringing the data plane resource to an intended state corresponding to the intended state data;

obtain second state data associated with the data plane resource, the second state data indicating a second state of the data plane resource;

identify, based at least in part on the second state data associated with the data plane resource, that the data plane resource is in the intended state corresponding to the intended state; and provide, to the control plane, an indication that the data plane resource is in the intended state based at least in part on updating, by the management plane, actual state data corresponding to the data plane resource and stored in the control plane.

12. The non-transitory computer-readable medium of claim 11, wherein executing the one or more orchestration tasks causes the data plane resource to be configured according to the intended state data.

13. The non-transitory computer-readable medium of claim 11, wherein the one or more processors of the management plane operate as part of a computing cluster comprising a plurality of computing nodes.

14. The non-transitory computer-readable medium of claim 11, wherein the one or more processors of the management plane identify the one or more orchestration tasks associated with bringing the data plane resource to the intended state corresponding to the intended state data.

15. The non-transitory computer-readable medium of claim 11, wherein executing the executable instructions further causes the one or more processors of the management plane to assign a monitoring agent to monitor health data of the data plane resource.

* * * * *